(No Model.)  2 Sheets—Sheet 1.
R. T. BISHOP.
BLOW LAMP.
No. 251,993. Patented Jan. 3, 1882.
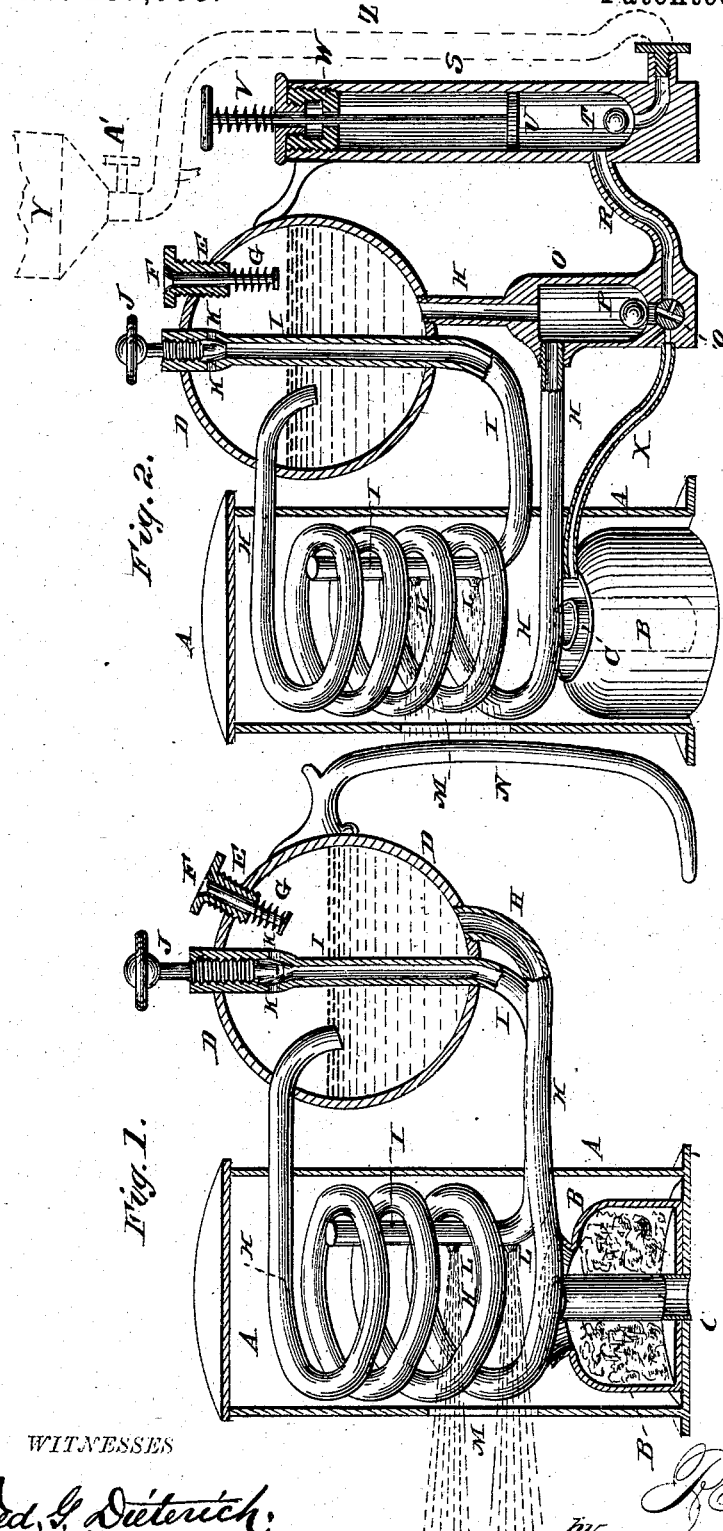

(No Model.) 2 Sheets—Sheet 2.
R. T. BISHOP.
BLOW LAMP.
No. 251,993. Patented Jan. 3, 1882.
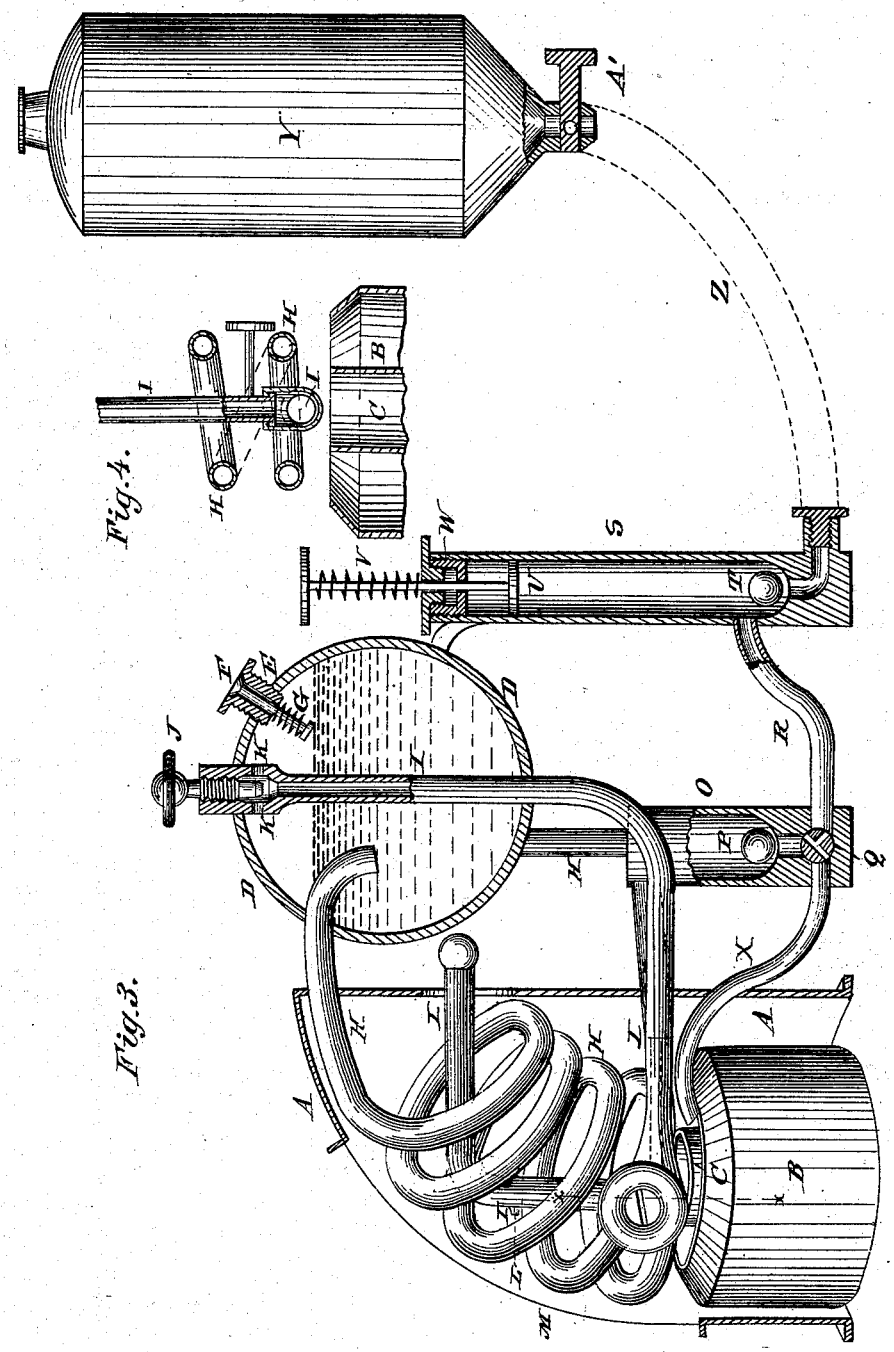
WITNESSES
Fred. G. Dieterich
P. C. Dieterich
INVENTOR
R. T. Bishop
by C. A. Snow and Co., Attorneys.

UNITED STATES PATENT OFFICE.

RICHARD T. BISHOP, OF ST. LOUIS, MISSOURI, ASSIGNOR OF ONE HALF TO THEODORE HUNT, OF SAME PLACE.

BLOW-LAMP.

SPECIFICATION forming part of Letters Patent No. 251,993, dated January 3, 1882.

Application filed September 16, 1881. (No model.)

*To all whom it may concern:*

Be it known that I, RICHARD THOMAS BISHOP, of St. Louis, Missouri, have invented certain new and useful Improvements in Blow-Lamps; and I do hereby declare that the following is a full, clear, and exact description of the invention, which will enable others skilled in the art to which it appertains to make and use the same, reference being had to the accompanying drawings, which form a part of this specification.

Figure 1 is a perspective view, partly in section, of my improved blow-lamp or paint-breamer. Figs. 2 and 3 are similar views, illustrating modifications of my invention; and Fig. 4 is a section on the line *x x*, Fig. 3.

Corresponding parts in the several figures are denoted by like letters of reference.

This invention relates to blow-lamps or paint-breamers for throwing a strong jet of flame and heat upon any particular spot or point where it may be needed—a kind of apparatus frequently required by plumbers, gas-fitters, painters, carriage-manufacturers, and others; and my invention consists in the improved construction and arrangement of parts, which will be hereinafter fully described, and particularly pointed out in the claims.

In Fig. 1 of the drawings hereto annexed I have illustrated the simplest form of my invention, which consists of a box or casing, A, in the bottom of which is arranged a small stove or lamp, B, filled with some suitable absorbent—such as asbestus or sponge—and having a central air-supply pipe.

Adjoining the rear side of the casing A is fitted a vessel or reservoir, D, provided with a screw-plug, E, by removing which the vessel may be filled with alcohol, hydrocarbon, or any burning-fluid which is to be employed. The plug E is provided with a centrally-located safety-valve, F, held in place by a coiled spring, G, as shown.

H is a tube or pipe, of copper, brass, or other suitable material, passing from the bottom of reservoir D through the back of casing A, within which it is coiled above the lamp B, its upper end passing back into the reservoir D.

I is a pipe arranged vertically in said reservoir, and provided at its upper end with a screw or regulating-cock, J, the handle of which extends above the reservoir, as shown. Just below the top of the reservoir the pipe I has openings K for the passage of steam or gas. The lower end of pipe I passes through the bottom of the tank or reservoir, through the back of the casing, and upward within the coiled pipe H, between the coils of which it is provided with one or more openings, L, facing the front of the casing, which has an opening, M, for the blast. N is a suitably-arranged handle, by which the device may be conveniently held by the operator.

When the lamp and reservoir have been filled the lamp is lighted, thus heating the coil and the fluid contained therein and generating gas, which escapes into the top of tank D, from whence it passes through cock J into pipe I, and out through the perforations or burners K of the latter, on escaping from which it is immediately ignited by the flame of the stove or lamp, thus producing a strong and exceedingly hot blast, which may, however, be easily regulated or extinguished by manipulating the cock J.

By the handle N the device may be readily manipulated so as to apply the blast where desired.

By the construction shown in Fig. 2 of the drawings the casing A, lamp B, reservoir D, with its screw-plug and safety-valve, and the pipe I, with its connections, are constructed and arranged substantially as above described; but to the pipe H (which is in other respects arranged as above specified) is attached, at a point between the tank and the casing, a small plunger-pump, consisting of a cylinder, O, having a ball-valve, P, arranged above a three-way cock, Q, and connected by a pipe, R, with the pump-body S, which also serves as a handle to the device, and which contains a ball-valve, T, and a piston or plunger, U, the stem of which is forced in an upward direction by a coiled spring, V, arranged between the top button of said stem and the stuffing-box W, in which it works, so that it may be readily manipulated by the operator holding the device. From the cylinder O a supply-pipe, X, leads to the stove or lamp B, which may thus, when the three-way cock Q is properly adjusted, be filled by working the feed-pump. By turning the cock the pipe X may be closed and the supply directed into the coiled pipe H, or both may be closed, as will be the case when the lamp B and reservoir D are both filled. The feed-pump draws its supply from a suitably-located supply-tank, Y, with which it is to be connected by a flexible tube, Z, having a stop-cock, A'.

The construction, as shown in Fig. 2, is preferable when a continuous blast is to be maintained for a long time, it being simply a convenient mode of filling the tank D and the lamp, thus enabling the machine to be made small, light, and easily manipulated.

The device shown in Fig. 3 differs from that in Fig. 2 mainly in the construction of the casing A, which has an arched open front, and in which the coiled pipe H is arranged in a curved position, as shown. The burner-pipe I, instead of being rigid, as above, consists of a jointed or swiveled section, B', enabling the flame or blast to be thrown successively in several directions. This device is specially adapted for the use of carriage-builders, but is of course not necessarily confined to such use.

From the foregoing description, taken in connection with the drawings hereto annexed, the operation and advantages of my invention will be readily understood. It is simple, inexpensive, easily manipulated, and far more effective than devices now in use.

Having thus described my invention, I claim and desire to secure by Letters Patent of the United States—

1. The combination of the casing A, lamp B, reservoir D, coiled pipe H, and burner-pipe I, all arranged and operating substantially as herein described, for the purpose set forth.

2. The combination of the reservoir, the lamp B, the heating-coil, and the burner-pipe I, having gage-cock J and perforations K, substantially as described, for the purpose set forth.

3. The combination of the casing, lamp, coiled pipe H, and the plunger-pump O S, the body of which, S, forms a handle to the device, the cylinder O, having a three-way cock, Q, and feed-pipe X, and a suitable tank, Y, and flexible tube Z, all arranged and operating substantially as described, for the purpose set forth.

4. In a blow-lamp or paint-breamer constructed substantially as described, the jointed or swiveled burner-pipe, as and for the purpose shown and specified.

In testimony that I claim the foregoing as my own I have hereto affixed my signature in presence of two witnesses.

RICHARD THOMAS BISHOP.

Witnesses:
   THEODORE HUNT,
   LOUIS D. PICOT.